United States Patent [19]
Wagner

[11] Patent Number: 5,853,461
[45] Date of Patent: Dec. 29, 1998

[54] PREVENTION OF ELECTROSTATIC CHARGING OF PNEUMATIC TIRES

[75] Inventor: Herbert Wagner, Bad Schönborn, Germany

[73] Assignee: Rhein Chemie Rheinau GmbH, Mannheim, Germany

[21] Appl. No.: 877,828

[22] Filed: Jun. 18, 1997

[30] Foreign Application Priority Data

Jun. 24, 1996 [DE] Germany ........................ 196 25 091.9

[51] Int. Cl.⁶ ............................... C09K 3/00; B28B 7/36
[52] U.S. Cl. ...................... 106/2; 106/38.22; 106/38.23; 106/38.24; 106/38.51; 106/38.7; 106/475; 106/476; 106/477
[58] Field of Search ..................... 106/2, 38.22, 38.24, 106/38.7, 475, 476, 477, 38.23, 38.25, 38.51

[56] References Cited

U.S. PATENT DOCUMENTS 5,618,336  4/1997  Wagner ........................................ 106/2

FOREIGN PATENT DOCUMENTS 2838836  3/1979  Germany ............................. 106/38.24

OTHER PUBLICATIONS

Chemical Abstract No. 118:148817 which is an abstract of Czech Patent No. 272333 (Jan. 1991).

WPIDS Abstract No. 81–65683D which is an abstract of Soviet Union Patent Specification No. 789199 (Dec. 1980).

*Primary Examiner*—Anthony Green
*Attorney, Agent, or Firm*—Connolly and Hutz

[57] ABSTRACT

Aqueous external release agent for pneumatic tires which contains a fatty alcohol polyglycol ether and conductive carbon black, for establishing the electrical resistance of the tire.

6 Claims, No Drawings

PREVENTION OF ELECTROSTATIC CHARGING OF PNEUMATIC TIRES

Pneumatic tires which in the main contain certain silica fillers instead of carbon black as the filler have superior running and wear properties. However these tires without carbon black—also called "green tires"—tend to become electrostatically charged because their electrical resistance is considerably higher and therefore their electrical conductivity considerably lower than that of tires containing carbon black. The electrostatic charging of tires and—if the resistance is high—the prevention of the discharge of electric charges from the vehicle to earth may lead to significant disturbances and hazards if an electric charge which is present is discharged to earth through a conductive connection. A connection of this kind may be produced, for example, by a person climbing in or out or by introducing a fuel hose.

Pneumatic tires which contain carbon black generally have a resistance of approximately $10^6$ ohms, measured from the crown to the bead. There is a provisional specification for this measurement, this being laid down in the WDK guideline 110. According to this a pneumatic tire belongs to "electrostatically active Class I" if it has a leakage resistance of less than $10^6$ ohms.

Pneumatic tires which do not contain carbon black do not satisfy this test; their electrical leakage resistance is approximately $10^{10}$ ohms. This may lead to significant problems, as indicated above. There is thus a need for a method for reducing the electrical resistance.

When moulding and vulcanizing pneumatic tires, the surface of the tire blank is spread with a solution which, after drying on, forms a film which prevents the tires from adhering to the vulcanization mould. A distinction is made between the external release agent and the internal release agent for the outside and the inside of the tire. Two different agents are therefore required, as the outside and the inside of the tire consist of different materials and the requirements to be met by the release agents in the vulcanization process differ. Many external release agents are produced using organic solvents as a base. It is, however, of considerable advantage to use a water-base external release agent. An agent of this kind is described in the German Offenlegungsschrift (laid open print) 43 43 818. A release agent of this kind has to meet quite high requirements. It must have a mould release effect, although at the same time should not impair the bond between different parts of the tire, e.g. the carcass and the tread. An optimum external release agent performs additional functions. It removes small air bubbles trapped between the mould and the tire surface, which might otherwise result in non-uniform vulcanization, and assists the flow of the rubber which has not yet been vulcanized, so that the mould is completely filled. Finally, the release agent ensures that the finished tire is visually attractive.

The invention is based on the knowledge that aqueous external release agents for producing pneumatic tires can be modified such that they additionally reduce the electrical resistance to a value of around $10^6$ ohms.

The invention provides an aqueous external release agent for producing pneumatic tires which contains a fatty alcohol polyglycol ether and electrically conductive carbon black. Fatty alcohol polyglycol ether (also abbreviated to ether in the following) and carbon black produce a positive synergistic effect. The ether is preferably a reaction product from an alkyl alcohol with 16 to 18 carbon atoms and ethylene glycol or propylene glycol, in which 5 to 80 moles of ethylene or propylene glycol react with one mole of the $C_{16}$–$C_{18}$ alcohol. The carbon black which is used is conductive furnace carbon black of an average particle diameter of 20 to 30 nm. The external release agent generally contains 1 to 20 wt. % of ether and 3 to 15% of the said carbon black. It is generally used in a quantity which is such that approximately 12 to 30, preferably 15 to 25 g release agent, corresponding to approximately 0.15 to 5 g ether and 0.45 to 5 g furnace carbon black, are found in each passenger car tire.

All attempts to introduce the said additives into the tread mixtures in order to achieve the desired conductances have been unsuccessful, as the tire quality deteriorated as a result.

The external release agent according to the invention preferably has the following composition:

| wt. % | |
|---|---|
| 3–20 | Amorphous silica gel powder with 3–70% water of crystallization, preferably with 65% average particle diameter 15 to 30 μm, preferably 20 μm |
| 0.2–0.5 | Pyrogenic silica average particle diameter 8 to 20 nm, preferably 12 nm |
| 1–20 | Furnace carbon black (powder, conductive) average particle diameter 20–30 nm (may be replaced by carbon black dispersion) |
| or | |
| 4–70 | Furnace carbon black dispersion (conductive) 25% furnace carbon black, average particle diameter 20–30 mn 6% wetting agent non-ionic 69% water |
| 0.3–15 | (calculated as $SiO_2$) Silica Sol 15–20 wt. % $SiO_2$ particle surface 50–500 m$^2$/g, preferably 200 m$^2$/g particle diameter 6–40 nm |
| 0–8 | Polyethylene dispersion 25% (as bonding agent) |
| 1–20 | Fatty alcohol polyglycol ether, preferably $C_{16}$–$C_{18}$ alcohol + 5 mol EO/mol to $C_{16}$–$C_{18}$ alcohol + 80 mol EO/mol (non-ionic surfactant for establishing the conductivity and the dispersing and bonding agent |
| 0.2–10 | Calcium lignosulphonate |
| 0.1–3 | fatty acid methyltauride sodium salt wetting, dispersing and bonding agent |
| 0–5 | Defoamer |
| 0.01–0.05 | Biocide |
| 30–80 | Water |

A particularly preferred product for coating the tire blanks has the following composition:

| wt. % (generally) | wt. % (in particular) | |
|---|---|---|
| Fillers | | |
| 3–20 | 8.75 | amorphous silica gel powder with approx. 65% water of crystallization, average particle diameter 20 μm (Daraclar 920) |
| 0–2 | 0.5 | pyrogenic silica, average particle diameter 12 nm Aerosil 200 |
| 1–20 | 4.5* | furnace carbon black (conductive) (Printex 3 or Printex V) |
| or | | |
| 4–70 | 19* | 25% furnace carbon black dispersion (conductive) (Derussol AN 1/25 L) |
| 0.3–15 | | (calculated as $SiO_2$) silica sol 15–20 wt. % $SiO_2$ particlesurface 50–500 mg$^2$/g, preferably |

-continued

| wt. % (generally) | wt. % (in particular) | |
|---|---|---|
| | | 200 m²/g, average particle diameter 6–40 nm |
| 0–8 antistatic agent and dispersing agent | 4 | 25% polyethylene dispersion (Permaid Di) |
| 1–20 wetting and dispersing agent | 7.25* | fatty alcohol polyglycol ether ($C_{16}$–$C_{18}$ alcohol + 6 mol EO/mol) (Rhenosin RC 100) |
| 0.2–10 | 2 | calcium lignosulphonate |
| 0.1–3 defoamer | | fatty acid methyltauride sodium salt |
| 0.5 biocide | 0.15 | triisobutyl phosphate (Etingal A) |
| 0.01–0.05 | 0.02 | 1,2-benzylisothiazoline-3-one (Proxel GXL) |
| water | | |
| 30–80 | 58.83 | water |

The electrostatic activity is mainly due to the fatty alcohol glycol ethers and conductive furnace carbon black, which together produce a positive synergistic effect.

EXAMPLE 1

Composition of the release agent:

| parts by weight | |
|---|---|
| 62.03 | water |
| 0.10 | Kelzan D |
| 0.70 | fatty acid methyltauride sodium salt (Hostapon CT dough) |
| 2.00 | calcium lignosulphate |
| 8.75 | amorphous silica gel powder, 65% water of crystallization, average particle diameter 20 μm (Daraclar 920) |
| 0.50 | pyrogenic silica, average particle diameter 12 μm (Aerosil 200) |
| 7.00 | furnace carbon black (Printex L) |
| 4.00 | 25% polyethylene dispersion (Permaid DI) |
| 7.25 | fatty alcohol polyglycol ether ($C_{16}$–$C_{18}$ alcohol * 6 mol ethylene glycol/mol) (Rhenosin RC 100) |
| 7.50 | silica sol 30 wt. % $SiO_2$ 200 m²/g, particle size 7–15 nm (Levasil 200 A 30) |
| 0.02 | 1,2-benzylisothiazoline-3-one (Proxel GXL) |
| 0.15 | triisobutyl phosphate (Etingal A) |

Production:

After the water is provided the active components are added one after the other in the above order and in each case subsequently stirred for 10 to 15 minutes. The suspension which is obtained is passed through a screen with a mesh size of 200 μm. It can then be directly sprayed.

Application:

Approximately 50,000 passenger car tires, the treads of which were produced with silica fillers, were sprayed with this agent in the conventional manner before vulcanization in a production trial, with 20 g of the solution, corresponding to approximately 6–7 g solids, being used for each tire. All the tires had an electrical resistance in the range of $10^6$ ohms.

EXAMPLE 2

Spray solution for the surface treatment of extruded treads

| wt. % | % |
|---|---|
| 1–15 | furnace carbon black (powder, conductive) average particle diameter 20–30 nm |
| or | |
| 4–50 | furnace carbon black dispersion (conductive) 25% carbon black, 6% wetting agent non-ionic 69% water |
| 1–6 | fatty alcohol polyglycol ether preferably $C_{16}$–$C_{18}$ alcohol + 6 mol EO/mol to $C_{16}$–$C_{18}$ alcohol + 80 mol EO/mol |
| 0.5–15 | silica sol 15–50 wt. % $SiO_2$ (calculated as $SiO_2$) 50–500 m²/g particle surface 6–40 nm average particle diameter, preferably 200 m²/g specific surface, 40 nm average particle diameter, preferably 7–15 nm. The silica sol is a bonding agent which is resistant to cooling water |
| 0.01–0.2 | polysaccharide, thickener |
| 0.01–0.1 | biocide |
| 50–80 | water |

The extruded treads produced with silica fillers were coated with the spray solution instead of the tire blanks. The tires thus produced had an electrical resistance in the range of $10^6$ ohms.

I claim:

1. An aqueous external releasing agent composition for pneumatic tires, comprising:
   (a) amorphous silica gel powder, in an amount between about 3 and about 20 weight percent of the composition, said amorphous silica gel powder having an average particle diameter of between about 15 and about 30μ and having between about 3 and about 70 percent water of crystallization;
   (b) pyrogenic silica, in an amount between about 0.2 and about 0.5 weight percent of the composition, said pyrogenic silica having an average particle diameter of between about 8 and about 20 nm;
   (c) (i) conductive furnace carbon black powder, in an amount between about 1 and about 20 weight percent of the composition, said conductive furnace carbon black powder having an average particle diameter of between about 20 and about 30 nm; or
      (ii) conductive furnace carbon black dispersion, in an amount between about 4 and about 70 weight percent of the composition, said conductive furnace carbon black dispersion comprising about 25% furnace carbon black having an average particle diameter of between about 20 and about 30 nm, about 6% non-ionic wetting agent, and about 69% water;
   (d) silica sol, in an amount between about 0.3 and about 15 weight percent of the composition, said silica sol comprising between about 15 and about 20 weight percent $SiO_2$ having a particle surface of between about 50 and about 500 m²/g and an average particle diameter of between about 6 and about 40 nm;
   (e) polyethylene dispersion, in an amount of up to about 8 weight percent of the composition, said polyethylene dispersion comprising about 25% polyethylene;
   (f) fatty alcohol polyglycol ether, in an amount between about 1 and about 20 weight percent of the composition;
   (g) calcium lignosulphonate, in an amount between about 0.2 and about 10 weight percent of the composition;
   (h) fatty acid methyltauride sodium salt, in an amount between about 0.1 and about 3 weight percent of the composition;

(i) defoamer, in an amount of up to about 5 weight percent of the composition;

(j) biocide, in an amount between about 0.01 and about 0.05 weight percent of the composition; and (k) water, in an amount between about 30 and about 80 weight percent of the composition.

2. The composition of claim 1, wherein said silica sol comprises between about 15 and about 20 weight percent $SiO_2$ having a particle surface of about 200 $m^2/g$ and an average particle diameter of between about 7 and about 15 nm.

3. The composition of claim 1, wherein said fatty alcohol polyglycol ether is a reaction product of about 1 mole of $C_{16-18}$ alcohol and between about 5 and about 80 moles of ethylene glycol or propylene glycol.

4. An aqueous external releasing agent composition for pneumatic tires, comprising:

(a) (i) conductive furnace carbon black powder, in an amount between about 1 and about 15 weight percent of the composition, said conductive furnace carbon black powder having an average particle diameter of between about 20 and about 30 nm; or (ii) conductive furnace carbon black dispersion, in an amount between about 4 and about 50 weight percent of the composition, said conductive furnace carbon black dispersion comprising about 25% carbon black, about 6% non-ionic wetting agent, and about 69% water;

(b) fatty alcohol polyglycol ether, in an amount between about 1 and about 6 weight percent of the composition;

(c) silica sol, in an amount between about 0.5 and about 15 weight percent of the composition, said silica sol comprising between about 15 and about 50 weight percent $SiO_2$ having a particle surface of between about 50 and about 500 $m^2/g$ and an average particle diameter of between about 6 and about 40 nm;

(d) polysaccharide, in an amount between about 0.01 and about 0.2 weight percent of the composition;

(e) biocide, in an amount between about 0.01 and about 0.1 weight percent of the composition; and (f) water, in an amount between about 50 and about 80 weight percent of the composition.

5. The composition of claim 4, wherein said silica sol comprises between about 15 and about 50 weight percent $SiO_2$ having a particle surface of about 200 $m^2/g$ and an average particle diameter of between about 7 and about 15 nm.

6. The composition of claim 4, wherein said fatty alcohol polyglycol ether is a reaction product of about 1 mole of $C_{16-18}$ alcohol and between about 6 and about 80 moles of ethylene glycol or propylene glycol.

* * * * *